United States Patent
Railsback

(10) Patent No.: US 8,087,425 B2
(45) Date of Patent: Jan. 3, 2012

(54) HOSE AND TUBING ASSEMBLIES AND MOUNTING SYSTEMS AND METHODS

(75) Inventor: Layne Railsback, Brighton, CO (US)

(73) Assignee: The Gates Corporation, Denver, CO (US)

( * ) Notice: Subject to any disclaimer, the term of this patent is extended or adjusted under 35 U.S.C. 154(b) by 824 days.

(21) Appl. No.: 11/487,913

(22) Filed: Jul. 17, 2006

(65) Prior Publication Data

US 2008/0011933 A1 Jan. 17, 2008

(51) Int. Cl.
*B65H 75/34* (2006.01)
(52) U.S. Cl. ....... 137/355.16; 248/62; 248/75; 138/106; 138/172
(58) Field of Classification Search ............. 137/355.16; 248/62, 74.1, 74.2, 74.4, 74.5, 73, 682, 75; 138/106, 107, 172
See application file for complete search history.

(56) References Cited

U.S. PATENT DOCUMENTS

| | | | | |
|---|---|---|---|---|
| 2,372,674 A | * | 4/1945 | Jordan | 248/65 |
| 2,837,120 A | * | 6/1958 | Galloway | 138/107 |
| 3,272,235 A | | 9/1966 | Haytock, III et al. | 138/107 |
| 3,848,839 A | * | 11/1974 | Tillman | 248/74.2 |
| 4,004,766 A | * | 1/1977 | Long | 248/55 |
| 5,301,907 A | | 4/1994 | Julian | 248/74.1 |
| 5,460,247 A | | 10/1995 | Fouts | 188/71.1 |
| 5,730,402 A | | 3/1998 | Sallen | 248/74.1 |
| 5,957,415 A | | 9/1999 | Perea | 248/58 |
| 6,497,836 B2 | | 12/2002 | Krause et al. | 264/263 |
| 6,508,442 B1 | * | 1/2003 | Dolez | 248/74.1 |
| 6,732,982 B1 | * | 5/2004 | Messinger | 248/74.1 |
| 6,830,075 B1 | | 12/2004 | McKinney et al. | 138/106 |
| 7,216,676 B2 | * | 5/2007 | Barnhouse et al. | 138/177 |
| 7,252,071 B2 | * | 8/2007 | Kochanowski et al. | 123/456 |
| 2004/0212184 A1 | * | 10/2004 | Canterberry et al. | 280/741 |
| 2007/0090231 A1 | * | 4/2007 | MacDuff | 248/62 |

FOREIGN PATENT DOCUMENTS

EP 0 617 217 A1 2/1994

OTHER PUBLICATIONS

Notification of Transmission of the International Search Report and the Written Opinion of the International Searching Authority, or the Declaration, Date of Mailing Jan. 29, 2008 for International Application No. PCT/US2007/015945, International Filing Date Jul. 13, 2007.

* cited by examiner

*Primary Examiner* — Kevin Lee
*Assistant Examiner* — Macade Brown
(74) *Attorney, Agent, or Firm* — T. A. Dougherty, Esq.; J. A. Thurnau, Esq.; P. N. Dunlap, Esq.

(57) ABSTRACT

A hose assembly includes a length of hose and a bracket. The bracket includes a rigid insert and a resilient overmold encapsulating at least a portion of the insert and mechanically bonding with at least a portion of an exterior of the hose. A method to produce this assembly may employ thermoplastic injection molding and include the steps of associating the rigid insert with the length of hose and overmolding the rigid insert and a section of the length of hose associated with the rigid insert with the resilient material, thereby encapsulating a portion of the insert and mechanically bonding the resilient material with the section of the length of the hose. A portion of the rigid insert may extend from the bracket and provide amounting holes and a bearing surface for mounting fasteners.

20 Claims, 5 Drawing Sheets

HOSE AND TUBING ASSEMBLIES AND MOUNTING SYSTEMS AND METHODS

BACKGROUND OF THE INVENTION

1. Field of the Invention

This invention relates generally to flexible hoses and bracketry for mounting such hoses and rigid tubing. More particularly, the present invention relates to hose or tubing assemblies including a hose or tube, a metal insert, and an overmolded thermoplastic mounting bracket.

2. Description of the Prior Art

Typically one of several different methods or designs for securing hose and/or tube assemblies to equipment will be employed. Such hose assemblies typically consist of a hose, length of rigid, and end fitting fluid connectors. Typically such designs are required to provide an ability to position and maintain the hose assembly relative to other components and protect the hose component of the assembly from mechanical damage, including damage incurred while mounting the hose assembly. Current designs may include: bolted metal brackets and elastomeric bushings; elastomeric coated or uncoated metal or plastic clips; integrally molded thermoplastic low temperature materials; and/or metal brackets welded to metal tubes which are then crimped onto hose ends using stems brazed to the tubing and/or ferrules.

However, existing bracket designs have performance problems, including: damage or fracture of thermoplastic materials resulting from forces applied to bolts or similar fasteners during installation; lack of adequate mechanical or adhesive integrity of the hose component to the coated or uncoated metal or plastic clips resulting in relative motion between the hose and the system components during service; displacement of elastomeric bushings installed between hose components and metal brackets; and similar problems. Additional problems can stem from complexity of components and manufacturing processes which may lead to high costs or inferior bracket to hose or bracket to tubing joinder resulting from efforts to cut cost or reduce manufacturing times.

It is also known that overmolding to smooth metal tubing has issues with rotational and axial movement of the tubing with respect to the overmolded components due to the low coefficient of friction between the molding material and the tube.

SUMMARY

The present invention is directed to systems and methods which provide hose assemblies employing a rigid mounting bracket, and an overmolded plastic material for bonding the rigid mounting bracket with the hose. Preferably, the mounting bracket is metal and at least a portion of the metal mounting bracket and hose are encapsulated by the plastic overmold material to provide such bonding.

Therefore, in accordance with the present invention systems and methods for securing a length of hose or tube to a structure may include a bracket having a rigid insert associated with a portion of the length of hose. Preferably, at least a portion of the rigid insert is overmolded with a resilient material that encapsulates at least a portion of the insert and that at least partially fuses or mechanically locks or joins with the exterior of the length of hose. This fusing or joining may be provided through flow of melted low viscosity thermoplastic material into intimate contact with the hose or tube during processing and through contraction of the overmold onto the hose or tube surface. The rigid insert preferably defines at least one mounting element, such as an orifice for securing the bracket, and thereby the length of hose, to the structure using at least one fastener. Preferably, at least a portion of the rigid insert that defines such a mounting orifice is not encapsulated by the resilient material and thereby provides a bearing surface for a fastener such as a bolt. In accordance with various embodiments of the present invention, the portion of the metal insert that is not overmolded may employ pins, holes, or other mounting device designs. Various embodiments of the insert are made of steel, aluminum or a similar rigid material or metal, such that the insert and thereby the bearing surface is stronger than the resilient material making up the overmold. The rigid insert may at least partially encompass a portion of the length of hose and the portion of the rigid insert encompassing the hose is preferably encapsulated by the overmold. However, the insert may not encompass the hose and may only be deployed adjacent to the hose. In order to impart a curve to the hose, a portion of the rigid insert that encompasses or contacts the hose may be curved, causing a curve to be formed in the hose when the insert and encompassing or contacting portion of the insert is overmolded. Another manner in which a curve may be formed in a hose may employ a curved overmold formed over a "straight" bracket encompassing a hose to impart a curve to the hose.

The present invention solves various performance problems associated with previous hose or tubing mounting designs. For example, damage or fracture of thermoplastic materials resulting from installation bolt fastener forces may be addressed by embodiments of the present invention, wherein at least a portion of a rigid metal mounting bracket is not encapsulated by the overmold, particularly the portion of the mounting bracket that includes bolt holes or the like. As a result mounting bolts are allowed to bear on the exposed metal rather than on unreinforced resin or the like as is often the case in previous brackets. As a further example, the lack of adequate mechanical or adhesive integrity of the hose component to an associated bracket is addressed in embodiments of the present invention by entirely overmolding the bracket and hose junction with a resin, or the like that can bond, mechanically, thermally and/or chemically with both the bracket and the hose or tube. Embodiments of the present invention also alleviate any need for elastomeric bushings or the like to be installed between hose components and metal brackets, as the present invention eliminates any relative movement between the bracket and the hose or tube. Additionally, an embodiment of the present invention can be employed in a hose assembly through a single step, relatively low skill-level procedure. Hence, adoption of the present invention in hose assemblies can result in reduced complexity of components and a simplification of manufacturing processes leading to reduced manufacturing and installation costs.

The combination of the insert over mold and hose or tube through the present invention by insert molding, such as through the use of pressure injection molding of the plastic overmold material, provides a robust assembly able to meet strenuous application and system requirements. This system robustness may be especially important in heavy duty applications, such as large trucks and heavy equipment. For example, a metal insert described provides robustness to resistance of clamping torques and pressures at the mounting surfaces. Additionally, a metal insert provides robustness to axial and rotational forces applied to the assembly resulting from system requirements. Advantageously, embodiments that employ a metal insert that partially encompasses the hose or tube can retain a hose or tube in place, at least to some degree, in the event that the over molded plastic material is damaged. Further, insert injection molding of the components is an economically efficient method of providing the function of the components in an assembly. As a further measure, the metal insert can contain cutaway portions and or reduced dimensions of thickness or area of the component resulting in weight savings. Preferably the overmolded plastic material provides an adjusted fit to both the hose and the metal insert components through controlled pressure molding of the material and by shrinkage of the material resulting from the molding process and shrinkage of the material after molding. Thereby, the overmolded material can provide radial forces capable of maintaining axial and rotational position on the hose preventing abrasive damage to the hose component. As a further feature, the over molded material can contain engraving or branding.

The over molded material can be disposed in such a manner to provide a mounting surface of the assembly to the system, including the aforesaid axial and radial positioning, as well as contact with system components such as frame members, while positioning the hose component away from direct contact with such system components. Additionally, the hose used in the assembly may contain a textile or metal outer surface, a polymeric elastomeric outer surface, or combinations of these outer surfaces which can contribute to the robustness of the assembly to axial and rotational stresses.

Another embodiment of the present invention includes an assembly of a metal tube, a metal bracket insert, and a resilient overmold for mechanical bonding of the metal bracket insert and tube at least partially encapsulated by the overmold. Methods for producing this assembly embodiment might include treatment of the tube to increase retention of the tube in orientation. As discussed above in relation to other embodiments of the present invention, the overmolded material has the properties of conforming to the insert surfaces, and of shrinking to grip these surfaces during and after molding providing force to hold the components together. Process injection and holding pressure and thermal properties of the materials contribute to the conforming and retention of the components in the desired orientation. Any remaining tendency to lose orientation of an overmolded metal tube may be addressed in certain alternative embodiments of the present invention by preforming the tube material with axial and radial upsets, which may provide mechanical interlocks with the overmold material.

Yet other embodiments of the present invention may include an assembly of one or more hoses or tubes, and an over molded plastic material which provides conformity of the hose to bends for routing the hose, with or without the use of a bracket insert associated with and/or encompassing a portion of some or all of the hoses and tubes. These embodiments provide connective bundling of two or more hoses or tubes in an assembly and may thereby provide environmental abrasion resistance and other advantages. Further, the use of a cured overmold that fuses, or at least mechanically bonds, to a surface of a hose through contraction of the overmold when it sets up to a relatively resilient rigidity can provide vacuum collapse resistance for a hose thus overmolded, and may provide thermal protection for the hose.

In a method for forming an assembly in accordance with such embodiments may comprise inserting the hose(s) or tube(s) into a cavity of an thermo-injection mold. Thermoplastic material can be molded around the hose either fully or partially on the outside diameter of the hose. Such thermoplastic material, in a cured state, can be rigid relative to the hose and cause the hose to maintain the molded curvature in application. Thus, two or more hoses can be inserted in a cavity of an injection mold and thermoplastic material can be molded around the hoses connecting the hoses into an assembly providing orientation of the hoses, relative to each other and other structures, in an application.

Further, in accordance with any of the above embodiments, a thermoplastic material molded around a hose can be chosen to provide for protection of the hose against abrasive damage to the hose from other components in the hose application environment and also chosen to provide thermal insulation protection of the hose to the environment. Foamed Polyphenylene Sulfide (PPS) sleeve might be a rigid, thermally protective sleeve material that could be used. Other embodiments might include ringed structures of overmolded thermoplastic material that adhere to the hose outside diameter and which prevent vacuum collapse of the hose. Additionally such overmolded rings may serve the function to space a hose away from a structure and prevent abrasion of the hose against the structure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
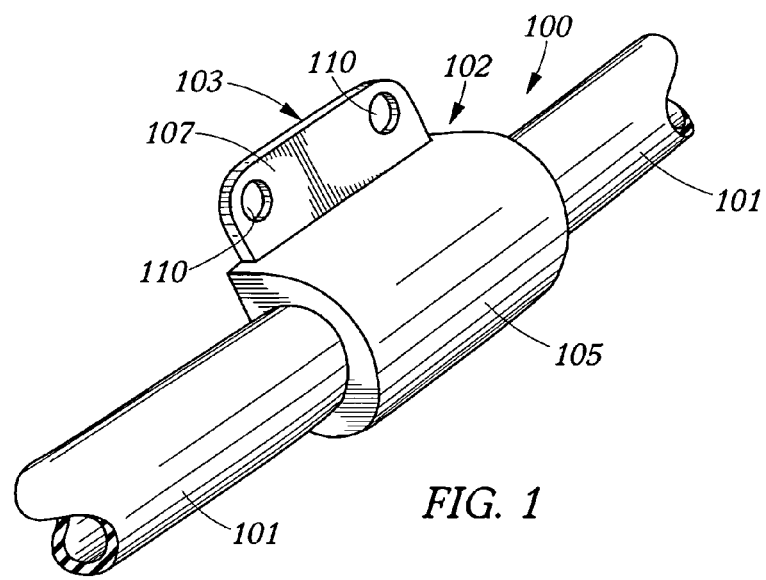
FIG. 1 is a perspective view of an embodiment of the present hose assembly.
Figure 2:
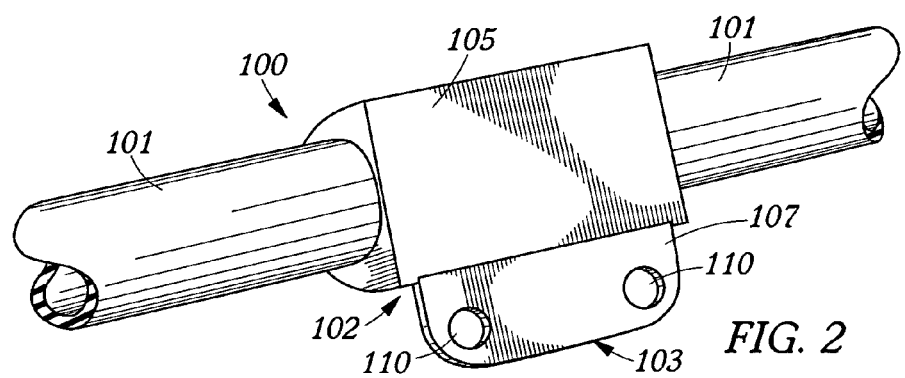
FIG. 2 is another perspective view of the embodiment of the present hose assembly shown in FIG. 1.
Figure 3:
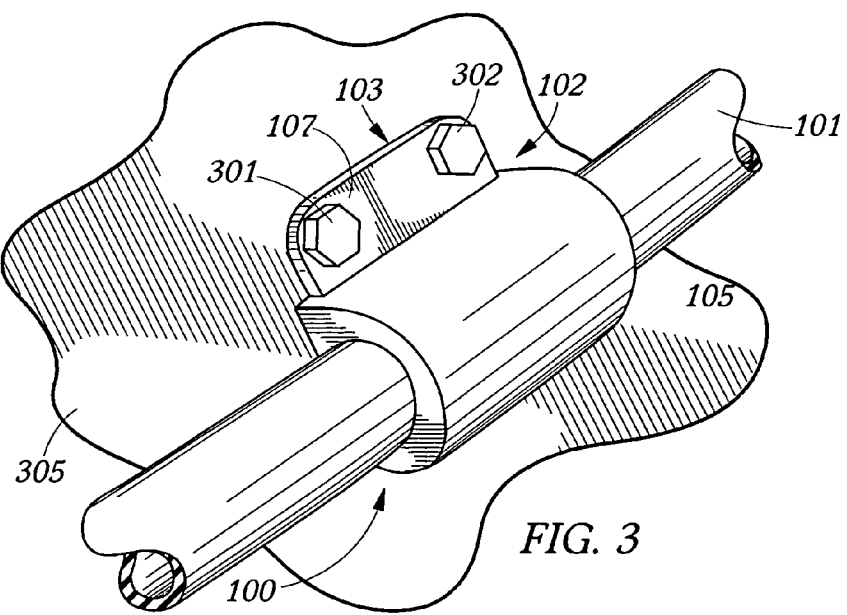
FIG. 3 is an environmental view of an embodiment of the present hose assembly mounted to a structure.

In accordance with embodiments of the present invention, a hose assembly, such as hose assembly 100 illustrated in FIGS. 1 and 2 might be deployed as a system to secure length of hose 101 in placed on a structure, such as shown in FIG. 3. The hose may be flexible and have a resilient rubber exterior, or the like. However, the exterior of the hose may have textile braid exterior, or the like. Additionally, the present invention may also incorporate tubing, either rigid or flexible, in place of hose 101. Rigid tubing may be metal tubing, or the like, and flexible tubing may be plastic.

Figure 4:
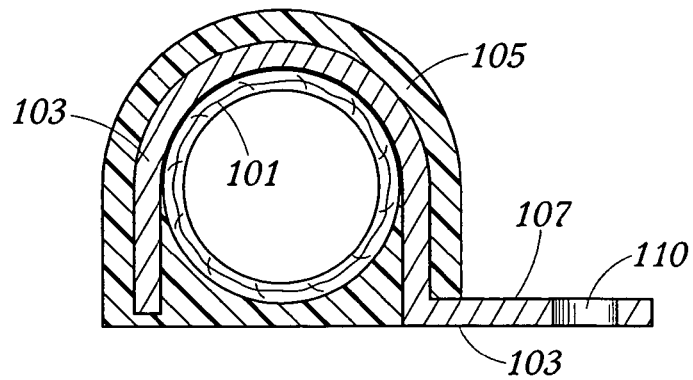
FIG. 4 is a fragmentary, generally cross sectional, view of an embodiment of the present hose assembly.

Hose assembly 100 also comprises bracket 102. The bracket includes rigid insert 103 and resilient overmold 105, encapsulating at least a portion of the insert and at least a portion of the hose associated with the insert. Preferably, as shown in cross sectional FIG. 4, this overmold is at least partially fused or otherwise mechanically bonded or joined with an exterior of the hose or tube. This bonding may occur as a result of flow of melted low viscosity thermoplastic material into intimate contact with the hose or tube during processing and resulting contraction of overmold 105 upon setting. Preferably, in accordance with embodiments of the present invention the resilient overmold is formed from plastic, which may be injection molded around a portion of the hose associated with the insert. The plastic may be a polymeric plastic, such as a thermoplastic commonly referred to as "nylon 66".

In accordance with embodiments of the present invention the rigid insert is formed from a durable, rigid metal such as steel or aluminum. Various embodiments of the present invention employ various arrangements of orifices, holes, slots slotted holes, or the like (110) defined in the insert for securing the bracket to a structure using a fastener, or the like. For example, bolts 301 and 302 are shown in FIG. 3 passing through orifices defined in insert 103 to secure assembly 100 to structure 305, which may be a frame member, body component, bulkhead fire wall, or the like of a vehicle, piece of equipment, or the like. Preferably, the rigid insert provides a bearing surface for the fasteners securing the bracket to the structure. In particular since the rigid insert may be formed of metal, or the like, it will be stronger and more resilient to forces imparted by fasteners such as bolts 301 and 302, or their installation, than resilient overmold 105. In other words, during installation bolts 301 and 3025 can be torque to a relatively high degree as it bears on unovermolded portion 107 of insert 103 without damaging assembly 100, and during operation bolts 301 and 302 will bear on unovermolded portion 107 without causing significant wear to any portion of the assembly.

Where the insert is formed from a material subject to corrosion or the assembly is deployed in a situation where the unovermolded portion of the insert it is particularly susceptible to corrosion the metal of the insert may be may be protected. For example, a steel insert may be galvanized or an aluminum insert, or at least the unovermolded portion, may be clear-coated.

Figure 5:
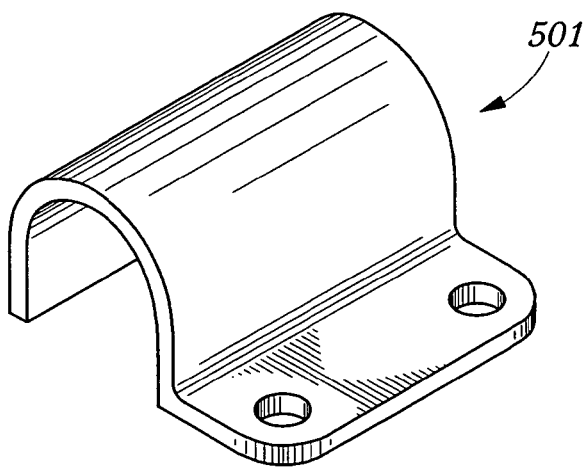
FIG. 5 is a perspective view of an embodiment of a rigid insert that may be employed in various embodiments of the present hose assembly.
Figure 6:
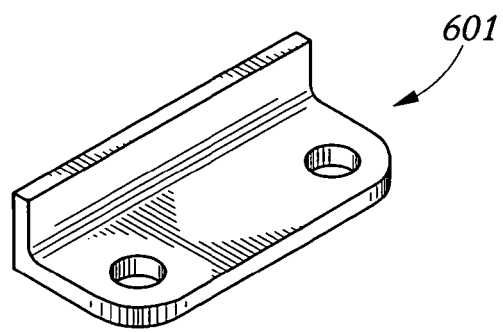
FIG. 6 is a perspective view of an embodiment of another rigid insert that may be employed in various other embodiments of the present hose assembly.

FIGS. 5 and 6 each show an embodiment of a rigid insert which may be employed in conjunction with the present invention. FIG. 5 shows rigid insert 501, which is intended to at least partially encompass the portion of hose or tube 101 that is encapsulated by overmold 105. This insert is also shown as insert 103 of the fragmented, generally cross sectional view of FIG. 4 encompassing hose 101, under overmold 105. Insert 601 shown in FIG. 6 may be deployed alongside hose 101 and at least partially encapsulated by the overmold, similar to insert 501. However, insert 601 does not encompass the associated portion of hose 101 in the same manner as insert 501.

Figure 7:
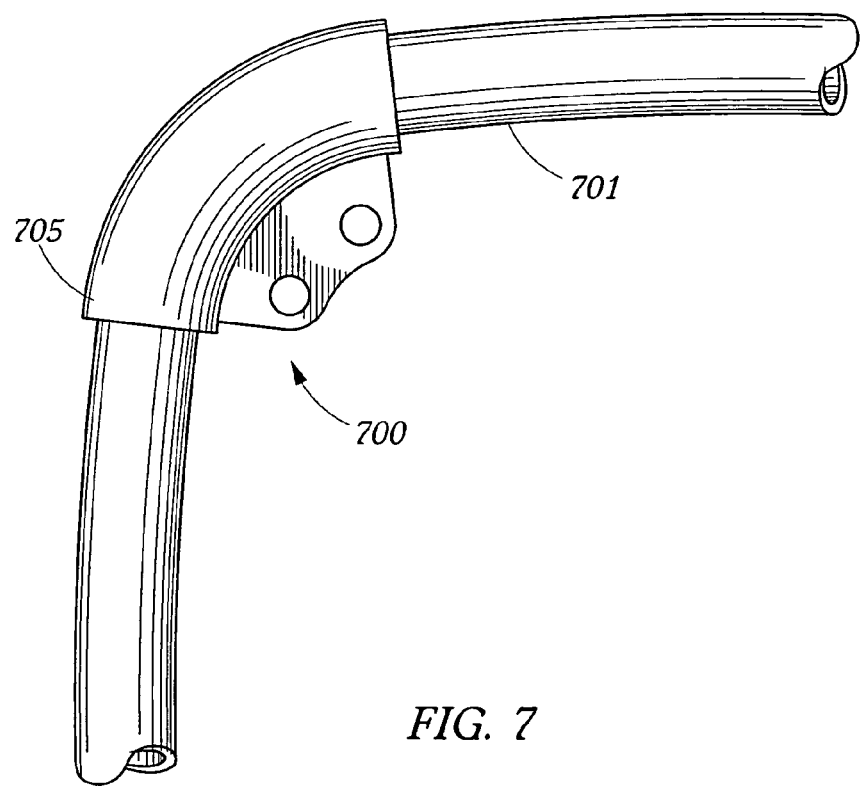
FIG. 7 is a top plan view of another embodiment of an assembly that imparts a curve to a hose in accordance with the present invention.
Figure 8:
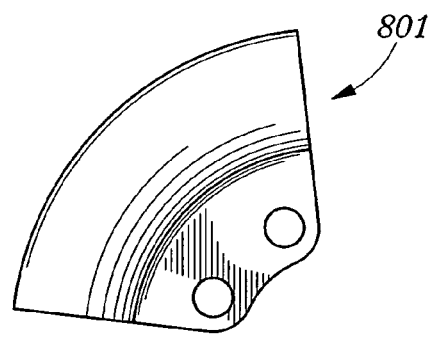
FIG. 8 is a top plan view of an embodiment of an insert for use in the assembly embodiment of FIG. 7.
Figure 9:
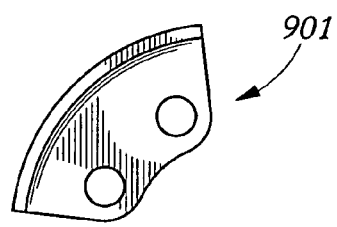
FIG. 9 is a top plan view of another embodiment of an insert for use in the assembly embodiment of FIG. 7.

In accordance with embodiments of the present invention the bracket may impart a curve to the hose in a hose assembly 700, as illustrated in FIG. 7. For example, the portion of the rigid insert 801 or 901 that encompasses a length of hose 101, and is encapsulated by overmold 705, may be curved, thereby, imparting a curve to hose 701.

Figure 11:
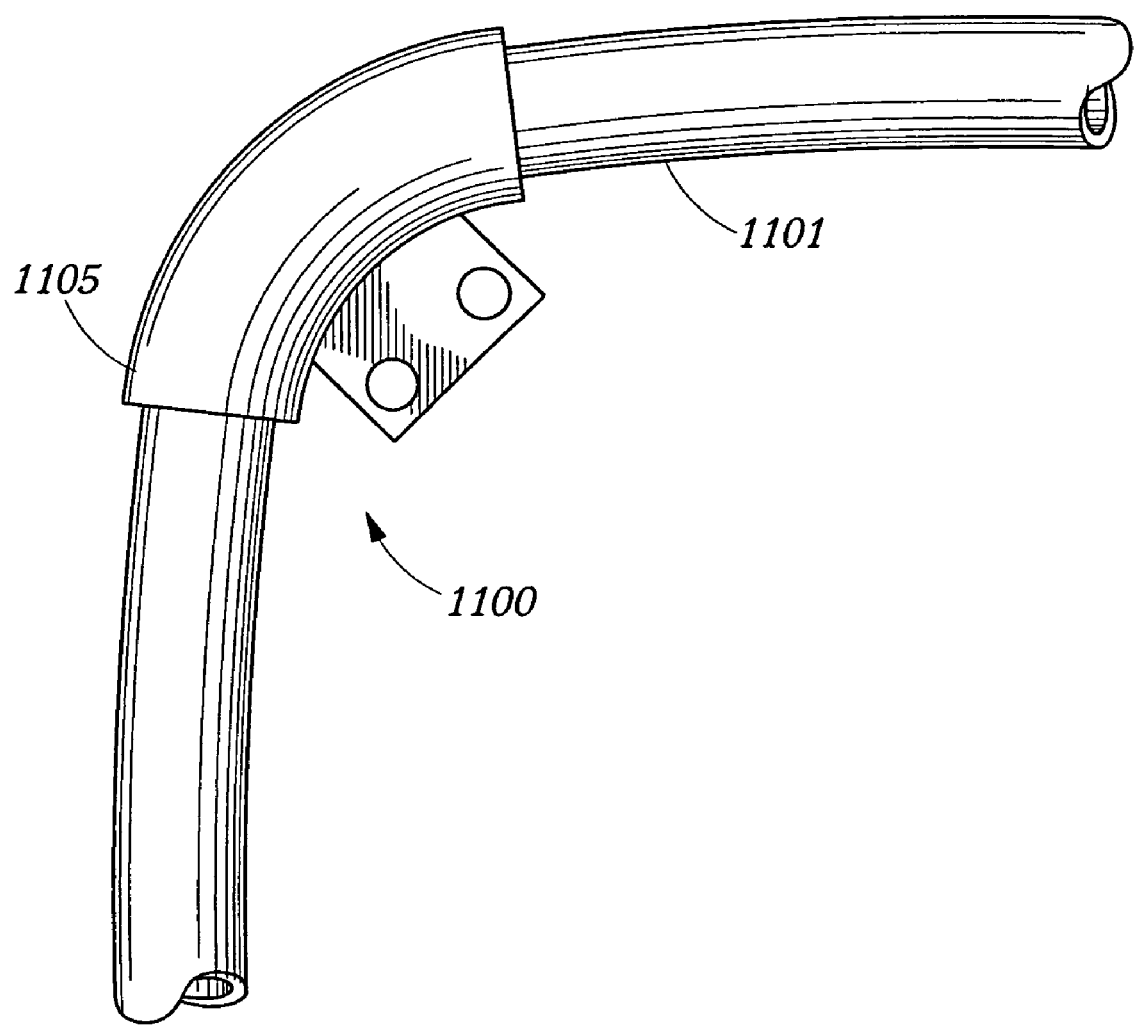
FIG. 11 is a top plan view of another embodiment of an assembly that imparts a curve to a hose in accordance with the present invention.

Alternatively, as shown in FIG. 11, a curve may be imparted in a hose 1100 in accordance with the present invention by overmolding a hose 1101 and an associated straight insert, such as inserts 501 or 601, with a curved overmold 1105. This may be accomplished through injection molding the overmold using a die or insert having the desired curved shape and disposing the hose in the injection molding apparatus with the desired curve. In this embodiment, the amount of overmold extending beyond the lateral limits of the insert may be greater (relatively significantly greater) than the amount of overmold shown extending beyond the lateral limits of the insert in FIGS. 1-3.

Figure 10:
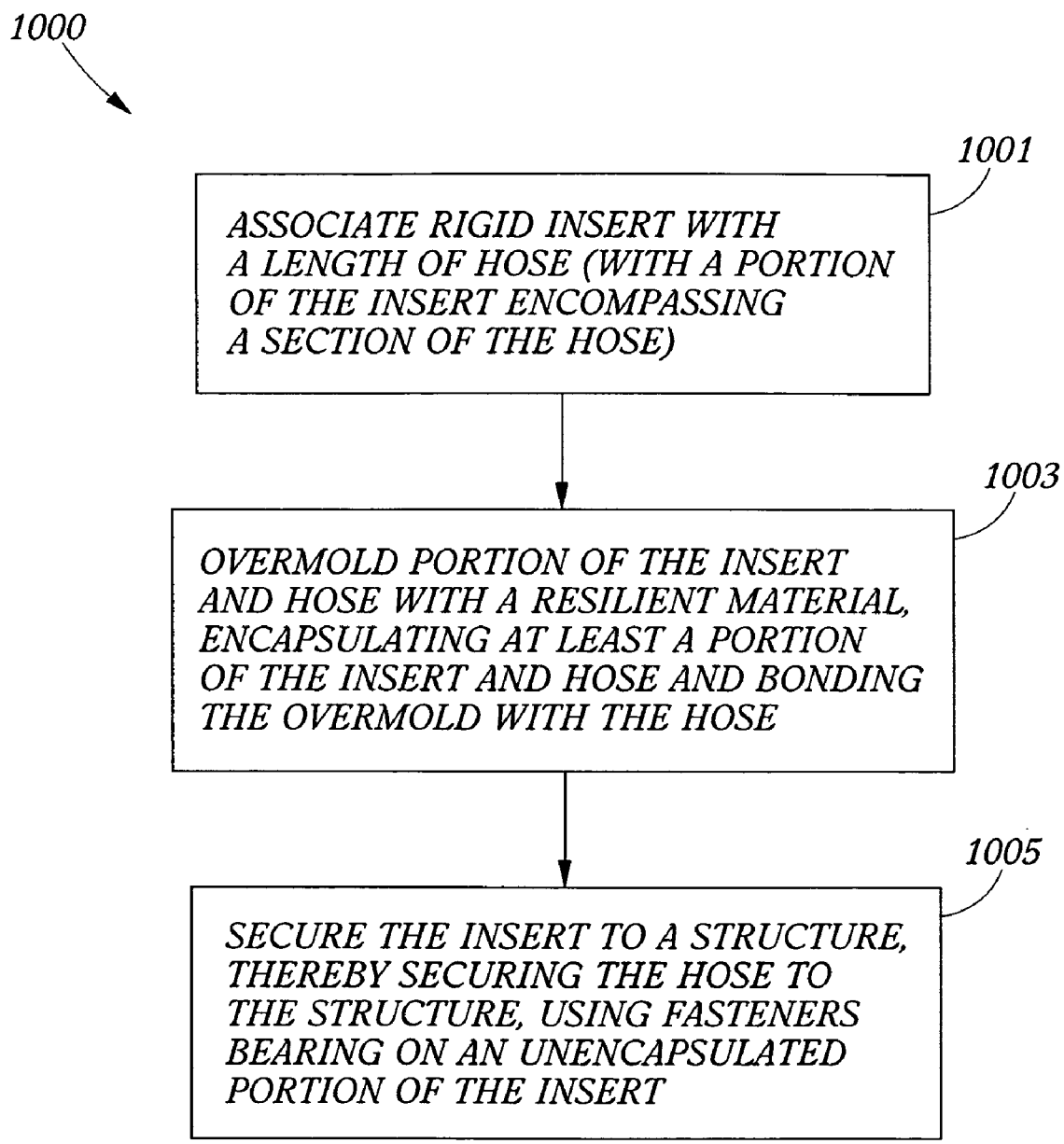
FIG. 10 is a flow chart of an embodiment of a method for forming a hose assembly or system in accordance with embodiments of the present invention.

Attention is now directed to flow chart 1000 of FIG. 10. To form an embodiment of assembly 100 a rigid insert, such as insert 501 or 601 is associated at 1001 with a segment of a length of hose. A portion of a rigid insert, such as portion 502 of insert 501 may encompass a portion of the hose, or an insert such as 601 may be disposed alongside, preferably in contact with a portion of the hose.

The rigid insert, and section of hose associated with the rigid insert, is overmolded at 1003 with a resilient material. Thereby, at 1005 a portion of the insert is encapsulated and the resilient material is at least partially fused or mechanically bonded with the exterior of the segment of hose, or bonded to the exterior of a tube used in place of the hose, such as through contraction of the overmold. The overmolding at 1005 may be accomplished by injection molding plastic in a shape encapsulating a portion of the rigid insert. During thermoplastic injection hose melted low viscosity thermoplastic material may flow (under pressure) into intimate contact with the hose or tube and upon setting contract and mechanically bond to the hose or tube.

Use of the resulting assembly as a system to secure the hose to a structure might call for securing the rigid insert to a structure using fasteners or the like at 1005. Preferably, fasteners securing the rigid insert to the structure bear on an unovermolded surface of the insert as discussed above.

The hose may be curved through use of a curved rigid insert, with the length of hose and conforming the length of hose the curve of the rigid insert. At 1001 the curved rigid insert is associated with the length of hose and the length of the hose is curved by conforming the length of hose to the curve of the rigid insert. When at 1003 the hose and insert are overmolded, at least the portion of the hose with the curved portion of the rigid insert is encapsulated and the curve is fixed in the hose.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    encompassing at least a portion of a hose with at least a portion of a generally rigid metal insert, said generally rigid metal insert having lateral limits; and
    overmolding said generally rigid metal insert and a section of said length of hose that includes said portion of said length of hose encompassed by said generally rigid metal insert with a resilient material, thereby encapsulating said portion of said insert encompassing said portion of said length of hose, and mechanically bonding said resilient material with said section of said length of said hose, said resilient material extending beyond said lateral limits of the generally rigid metal insert, wherein said generally rigid metal insert defines a mounting orifice through which a fastener completely extends, to secure said bracket to a structure using the fastener, wherein said generally rigid metal insert partially, but not fully, encircles said hose, wherein said overmolding further comprises overmolding said generally rigid metal insert and a section of said hose extending beyond said insert in a curved configuration such that said hose is curved.

2. The method of claim 1 wherein said resilient material is thermoplastic material and said overmolding further comprises allowing said thermoplastic material to cool and contract, thereby mechanically bonding said resilient material with said section of said length of said hose.

3. The method of claim 1, wherein said overmolding comprises injection molding plastic in a shape encapsulating a portion of said generally rigid metal insert.

4. The method of claim 1, further comprising:
    securing said rigid insert to a structure.

5. The method of claim 4 wherein said securing comprises fastening said rigid insert to a structure.

6. The method of claim 5 wherein fasteners securing said rigid insert to said structure bear on an unovermolded surface of said insert.

7. The method of claim 6 further comprising:
    bearing force from a fastener securing said rigid insert on an unovermolded surface of said rigid insert.

8. The method of claim 1 further comprising:
    curving said length of hose by associating a curved rigid insert with said length of hose and conforming said length of hose to the curve of said rigid insert.

9. The method of claim 1 further comprising: associating a curved rigid insert with said length of hose and said length of said hose is curved by conforming said length of hose to the curve of said rigid insert, encompassing at least a portion of said hose with at least a curved portion of said rigid insert and overmolding at least said curved portion of said rigid insert and the portion of said length of hose encompassed thereby.

10. The method of claim 1, wherein said hose is flexible and an exterior comprises a textile braid.

11. The method of claim 1, wherein said hose is flexible and an exterior is rubber.

12. The method of claim 1, wherein said resilient material is plastic.

13. The method of claim 12, wherein said plastic is a polymeric plastic.

14. The method of claim 12, wherein said plastic is nylon 66.

15. The method of claim 1, wherein said metal rigid insert comprises a metal which is steel.

16. The method of claim 15, wherein said steel is galvanized.

17. The method of claim 1, wherein said fastener comprises a bolt passing through said orifice for securing to a structure.

18. The method of claim 1, wherein said rigid insert provides a bearing surface for said fastener securing said bracket to said structure.

19. The method of claim 18, wherein said bearing surface is stronger than material comprising said resilient overmold.

20. The method of claim 1, wherein said metal rigid insert comprises a metal which is corrosion resistive.

* * * * *